(12) United States Patent
Harris

(10) Patent No.: US 6,286,704 B1
(45) Date of Patent: Sep. 11, 2001

(54) FUEL TANK CLOSURE WITH CAP EJECTOR SPRING

(75) Inventor: Robert S. Harris, Connersville, IN (US)

(73) Assignee: Stant Manufacturing Inc., Connersville, IN (US)

( * ) Notice: Subject to any disclaimer, the term of this patent is extended or adjusted under 35 U.S.C. 154(b) by 0 days.

(21) Appl. No.: 09/658,606

(22) Filed: Sep. 8, 2000

Related U.S. Application Data

(60) Provisional application No. 60/153,420, filed on Sep. 10, 1999.

(51) Int. Cl.[7] .................................................. B65D 41/04
(52) U.S. Cl. ................... 220/304; 220/295; 220/DIG. 33
(58) Field of Search ................................... 220/86.2, 288, 220/293, 295, 304, 378, DIG. 33

(56) References Cited

U.S. PATENT DOCUMENTS

| | | |
|---|---|---|
| 3,968,897 | 7/1976 | Rodgers . |
| 4,051,975 | 10/1977 | Ohgida et al. . |
| 4,304,339 | 12/1981 | Sakai et al. . |
| 4,887,733 | 12/1989 | Harris . |
| 5,385,256 | 1/1995 | Brown . |
| 5,615,793 | 4/1997 | Muller . |
| 5,791,507 | 8/1998 | Harris et al. . |
| 5,794,806 | 8/1998 | Harris et al. . |
| 5,829,620 | 11/1998 | Harris . |
| 6,079,584 | 6/2000 | Griffin . |
| 6,095,363 | 8/2000 | Harris . |

FOREIGN PATENT DOCUMENTS

| | | |
|---|---|---|
| 4041536 A1 | 6/1992 | (DE) . |
| WO 95/30592 | 11/1995 | (WO) . |
| WO 97/20747 | 6/1997 | (WO) . |

OTHER PUBLICATIONS

PCT International Search Report.

*Primary Examiner*—Nathan J. Newhouse
(74) *Attorney, Agent, or Firm*—Barnes & Thornburg

(57) ABSTRACT

A fuel cap has an upper housing and a lower housing, each configured to be inserted into the filler neck of a vehicle fuel system. The upper housing and lower housing are cooperatively configured to allow both rotational and axial relative movement with respect to one another. A seal coupled to the lower housing sealingly engages the filler neck when the fuel cap is in a tightened position. A spring mount is coupled to the lower housing and engages a spring that is positioned to bias the lower housing axially toward the upper housing to assist in loosening contact of the seal and filler neck during removal of the fuel cap. The fuel cap further has a drive axially spacing the upper housing from the lower housing as the upper housing rotates relative to the lower housing. A cam and cam follower connection between the upper and lower housing provides the drive. At least one lug extends from the lower housing to engage a respective notch formed on the interior surface of the filler neck and the lugs and notch cooperate to prevent rotation of the lower housing relative to the filler neck when the cap is in the tightened position.

29 Claims, 3 Drawing Sheets

FUEL TANK CLOSURE WITH CAP EJECTOR SPRING

This application claims priority under 35 USC 119(e) based upon United States Provisional Application No. 60/153,420 filed on Sep. 10, 1999, which disclosure is incorporated by reference herein.

BACKGROUND AND SUMMARY OF THE INVENTION

The present invention relates to fuel tank closures. More particularly, the present invention relates to a fuel tank closure having a housing assembly and a seal coupled to the housing assembly. The seal is positioned to engage a tank filler neck to provide a sealed closure of the tank filler neck.

A fuel cap for a filler neck a vehicle fuel system includes an upper housing and a lower housing configured to be inserted into the filler neck. The upper housing and lower housing are cooperatively configured to allow both rotational and axial relative movement with respect to one another.

A seal is positioned to lie between the lower housing and the filler neck, thereby creating a seal when the fuel cap is moved to a tightened position. A spring mount is coupled to the lower housing. A spring, preferably a compression spring, engages both the spring mount and the upper housing to bias the lower housing axially toward the upper housing. This bias assists in loosening contact of the seal and filler neck during removal of the fuel cap.

In preferred embodiments, a cam and cam follower connection is provided between the upper and lower housing. The cam and cam follower connection includes at least one cam arranged on an upper surface of the lower housing and positioned on the upper surface so that the cam slopes upward toward the upper surface to engage a cam follower depending from a lower flange of the upper housing. In other embodiments, these locations may be reversed: the cam may be configured on the upper housing and the cam follower may be configured on the lower housing. In either embodiment, the cam and cam follower cooperate to generate relative axial movement as the upper housing is rotated relative to the lower housing.

Each cam includes a wall at a lower end of the cam and a detent formed adjacent an upper end and configured to receive a lower end of the cam follower.

The cap includes at least one lug extending radially outwardly from the outer surface of the lower housing. Each lug engages a respective notch in the filler neck when the cap is moved to the tightened position to prevent rotation of the lower housing relative the filler neck when the cap is in the tightened position.

Additional features of the invention will become apparent to those of ordinary skill in the art upon consideration of the following detailed description of preferred embodiments exemplifying the best mode of carrying out the invention as presently perceived.

BRIEF DESCRIPTION OF THE DRAWINGS

The detailed description particularly refers to the accompanying figures in which.

DETAILED DESCRIPTION OF THE PREFERRED EMBODIMENTS

Figure 1:
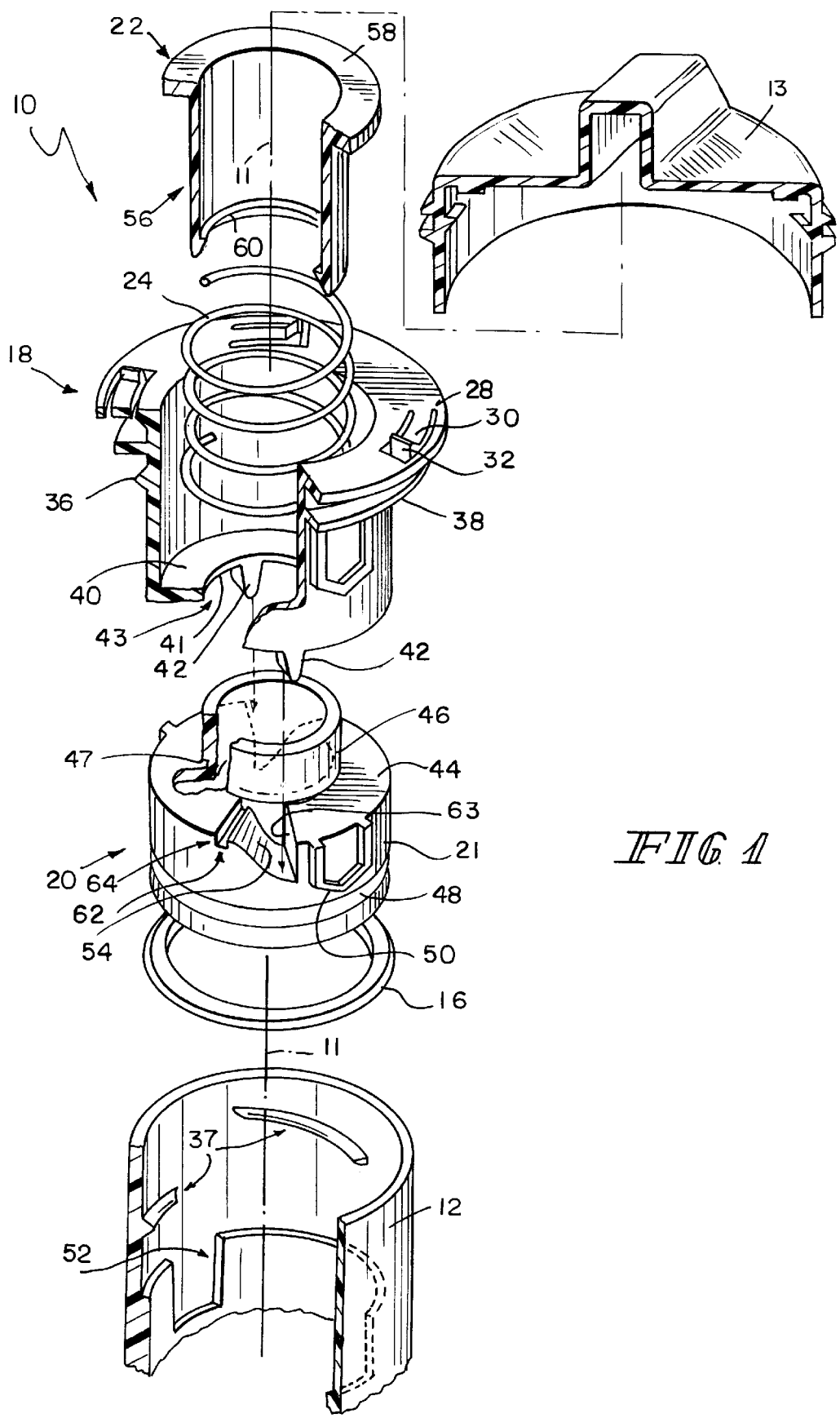
FIG. 1 is an exploded assembly view of a fuel tank closure positioned above a filler neck.
Figure 2:
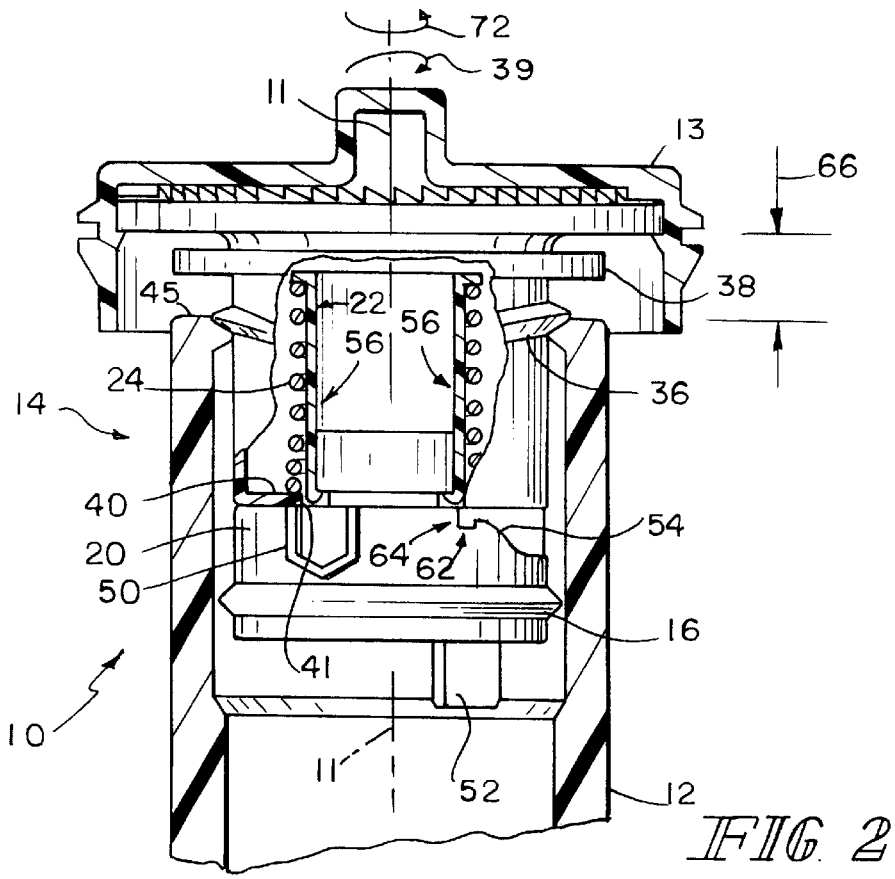
FIG. 2 is a side elevation view of the fuel tank closure of FIG. 1 showing the fuel tank closure assembled and in a position prior to installation.
Figure 3:
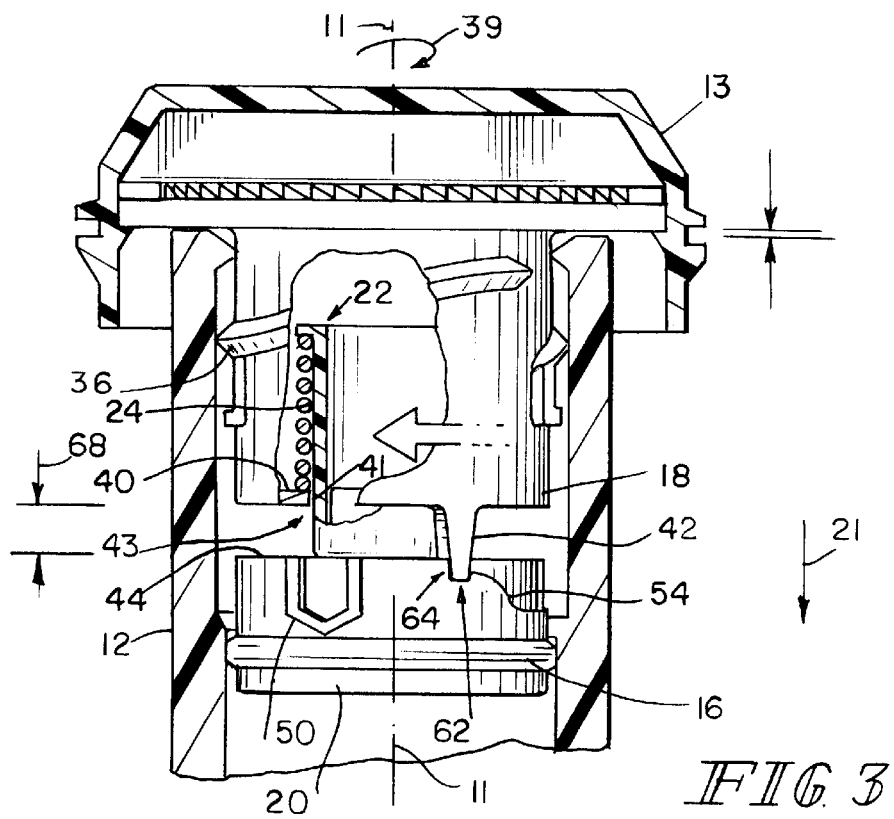
FIG. 3 is a side elevation view similar to FIG. 2 showing the fuel tank closure in an installed position within the filler neck.

A fuel tank closure 10 in accordance with the present disclosure is shown in FIG. 1. Closure 10 is movable relative to a fuel tank filler neck 12 between a disengaged position, as shown in FIG. 2, and an installed position as shown in FIG. 3. Closure 10 includes a housing assembly 14 and a seal 16 coupled to housing assembly 14. While closure 10 is in the installed position, seal 16 engages filler neck 12 and cooperates with housing assembly 14 to substantially seal filler neck 12.

While seal 16 is engaged with filler neck 12, fuel (not shown) in communication with filler neck 12 can cause seal 16 to swell. This swelling increases the compression force between seal 16 and filler neck 12. This increased force creates more resistance to removal of seal 16 from filler neck 12 making closure 10 more difficult to remove from filler neck 12.

To aid in removal of seal 16 from filler neck 12, seal 16 is axially biased outwardly to provide a force that assists in pulling seal 16 from filler neck 12. Closure 10 includes an ejector spring 24 that provides this force. Ejector spring 24 stores energy during installation of closure 10 in filler neck 12. During removal of closure 10, this stored energy is released to aid in pulling seal 16 from filler neck 12. Ejector spring 24 could be any force generator configured to provide the seal pulling force described herein and is a compression spring in the illustrated embodiment.

Housing assembly 14 includes an upper housing 18 that receives ejector spring 24 and a lower housing 20 that carriers seal 16. Closure 10 further includes a spring retainer or mount 22 positioned within upper housing or upper body 18 and coupled to lower housing or lower body 20. Spring 24 is positioned between spring mount 22 and upper housing 18.

Spring mount 22 couples lower housing 20 to upper housing 18 so that lower housing 20 can move axially relative to upper housing 18 as shown, for example, in FIGS. 2 and 3. While in the disengaged position, lower housing 20 is positioned to lie adjacent to upper housing 18 as shown in FIG. 2. While in the engaged position, lower housing 20 is spaced apart from upper housing 18 as shown in FIG. 3.

Spring 24 biases lower housing 20 toward upper housing 18 through spring mount 22. As lower housing 20 moves away from upper housing 18, spring 24 is compressed so that the biasing force provided by spring 24 increases. As previously mentioned, this additional biasing force aids in pulling seal 16 and lower housing 20 out off engagement with filler neck 12.

Upper housing 18 includes a cylindrical body 26 and an upper flange 28 coupled to cylindrical body 26. A handle 13 is coupled to upper flange 28 of upper housing 18 for a user to grip and turn upper housing 18. A suitable handle is disclosed in PCT Patent Application Ser. No. PCT/US98/00863 to Jeffery Griffin and titled Quick-On Filler Neck Cap which is expressly incorporated by reference herein. Other handle configurations may also be used including handles having lost motion and/or breakaway features.

Upper flange 28 includes a plurality of flexible arms 30 having pawl teeth 32 providing a torque-override feature between the handle 13 and upper housing 18. Additional description of the torque-override feature is disclosed in PCT Patent Application Serial No. PCT/US98/00863, which disclosure is incorporated by reference herein. Other forms of torque-override may also be used with the presently preferred closure.

As shown in FIG. 2, upper housing 18 includes a pair of helical cap mounting members 36 coupled to cylindrical body 26 and lower housing 18 includes a pair of position-locator lugs 50 coupled to cylindrical body 21. As the handle 13 and upper housing 18 are rotated in a cap-installation direction 39, mounting members 36 engage complementary formations 37 on filler neck 12 to pull closure 10 axially into filler neck 12. Additional description of mounting members 36 and position-locator lugs 50 is disclosed in PCT Patent Application Serial No. PCT/US98/00863, which disclosure is incorporated by reference herein.

Upper housing 18 further includes a middle flange 38 coupled to cylindrical body 26. Middle flange 38 engages an upper end 45 of filler neck 12 to provide a stop for the axially inward movement of upper housing 18 as the handle 13 is turned in a clockwise cap-installation direction 39. According to an alternative embodiment, a C-shaped seal is coupled to an underside of the middle flange to engage and seal with the upper end of the filler neck.

As shown in FIG. 1, upper housing 18 also includes a lower flange 40 that extends radially inwardly. Lower flange 40 includes an inner edge 41 having an inside diameter that is less than the diameter of spring 24 so that spring 24 pushes against lower flange 40 when closure 10 is assembled. Inner edge 41 defines an aperture 43 in which spring mount 22 is positioned after assembly of closure 10. Upper housing 18 also includes several axially downwardly extending cam followers 42 appended to an underside of lower flange 40 that engage cams 54 provided on lower housing 20 to provide the axial movement between upper and lower housings 18, 20. In illustrated disclosure, the cams 54 are the "driven members" and the cam followers 42 are the "drivers" since rotation of the cam followers 42 about a central axis 11 of closure 10 (in response to rotation of handle 13 and upper housing 18 about central axis 11) causes cam follower 42 to ride on cams 54 and urge lower housing 20 downwardly along central axis 11 and in direction 21 (as shown in FIG. 3) to cause the seal 16 to seal against an inner wall of filler neck 12.

Lower housing 20 includes a snap-receiving portion 46 that extends upwardly from upper surface 44 of lower housing 20. Snap-receiving portion 46 includes a groove 47 formed at a lower end thereof for engaging spring mount 22. Lower housing 20 includes a seal-receiving groove 48 sized to receive seal 16 as shown in FIG. 2. As shown in FIG. 3, a pair of lugs 50 (one shown) are coupled to cylindrical body 21 of lower housing 20. Lugs 50 engage a formation defining a notch 52 formed in filler neck 12 to prevent rotation of lower housing 20 during rotation of upper housing 18 by the handle 113. Additional detail of the relationship between and configuration of lugs 50 and filler neck 12 is disclosed in PCT Patent Application Ser. No. PCT/US96/19589 to Robert S. Harris and Jeffery Griffin and titled Quick-On Fuel Cap which is expressly incorporated by reference herein.

As shown in FIG. 1, lower housing 20 includes several cams 54 (two shown) positioned on upper surface 44 to engage cam followers 42 of upper housing 18 to provide the axial movement between upper and lower housings 18, 20. Additional detail of the relationship between and configuration of cam followers 42 and cams 54 is disclosed in PCT Patent Application Ser. No. PCT/US95/01561 to Robert S. Harris and Jeffery Griffin and titled Quick-On Cap with Removal Delay Mechanism which is expressly incorporated by reference herein.

In a preferred embodiment, the cam 54 is shown to extend upward toward an upper surface 44 of the lower body 20, and configured to engage a cam follower 42 depending from a lower flange 40 of the upper body 18. In another preferred embodiment, the cam 54 and cam follower 42 positions may be reversed; specifically, the cam 54 may depend downwardly from a lower flange 40 of the upper body 18 and the cam follower 42 may extend upwardly from an upper surface 44 of the lower body 20.

A pressure/vacuum-relief valve may also be provided with closure 10. For example, a pressure/vacuum-relief valve, a pressure-relief valve, or a vacuum-relief valve may be positioned within the body of the lower housing. A suitable pressure/vacuum-relief valve is described in PCT Patent Application Ser. No. PCT/US95/01561, which disclosure is incorporated by reference herein. Other configurations of pressure/vacuum-relief valves may also be used.

Spring mount 22 includes a cylindrical body 56 and a flange 58 coupled to an upper end of cylindrical body 56 as shown in FIG. 1. Flange 58 has an outside diameter that is greater than the diameter of spring 24 so that ejector spring 24 pushes against flange 58 to bias spring mount 22 upwardly.

Spring mount 22 also includes a snap ridge 60 coupled to a lower end of cylindrical body 56 to rigidly couple spring mount 22 to lower housing 20. During assembly of closure 10, body 56 of spring mount 22 is positioned within spring 24, as shown in FIG. 1, and inserted through aperture 43 of upper housing 18. Snap ridge 60 is forced over snap-receiving portion 46 into groove 47 to couple spring mount 22 to lower housing 20.

After assembly, ejector spring 24 is positioned between flange 58 of spring mount 22 and lower flange 40 of upper housing 18. Spring 24 is slight compressed to provide an upward bias of spring mount 22 relative to upper housing 18. Because of the coupling of spring mount 22 to lower housing 20, lower housing 20 is also provided with an upward bias toward upper housing 18.

During installation, lower housing 20 moves downwardly in direction 21 away from upper housing 18 as shown in FIG. 3 as upper housing 18 is rotated in clockwise direction 39 relative to filler neck 12 in response to clockwise rotation of the handle 39 that is coupled to upper housing 18. Lower housing 20 and seal 16 do not rotate relative to filler neck 12 during rotation of the handle 13 and the upper housing 18 in the clockwise cap-installation direction 39. Instead, lug 50 carried on lower housing 20 engages notch 52 on filler neck 12 to prevent any substantial rotation of lower housing 20 in clockwise direction 39 relative to filler neck 12 so that upper housing 18 is allowed to rotate relative to lower housing 20.

During rotation of upper housing 18 in the tightening or cap-installation direction 39 with respect to lower housing 20, cam followers 42 of upper housing 18 ride on cams 54 of lower housing 20 to drive lower housing 20 and seal 16 axially inward in direction 21 further into filler neck 12. Cam followers 42 continue to ride on cams 54 until each cam follower 42 overrides a detent 62 provided on upper surface 44 adjacent the top of the cam slope defined by cams 54, and is stopped by stop 64. Detents 62 cooperate with cam followers 42 to provide latching engagement between upper and lower housings 18, 20 and cooperate with stops 64 to prevent accidental sliding of cam followers 42 back down cams 54 in the loosening direction 72.

During rotation of the handle 13 in the clockwise tightening direction 39, upper and lower housings 18, 20 are pulled into filler neck 12 by the rotational engagement of helical mounting members 36 of upper housing 18 and lower housing 20 is pushed further into filler neck 12 by the engagement of the "driving" cam followers 42 of upper housing 18 with "driven" cams 54 of lower housing 20. As illustrated in FIG. 3, upper and lower housings 18, 20 move a first distance 66 into filler neck 12 during installation and upper housing 18 pushes lower housing 20 into filler neck 12 by an additional distance 68 so that lower housing 20 and seal 16 travel a total distance equal to the sum of distances 66,68 during rotation of the handle 13 in cap-installation direction 39. During the axially inward movement, seal 16 engages filler neck 12 to form a substantial seal therewith to block the flow of fuel and fuel vapor from escaping from filler neck 12 between seal 16 and filler neck 12.

During the movement of lower housing 20 away from upper housing 18, ejector spring 24 is compressed by distance 68 to store energy. Because spring mount 22 is coupled to lower housing 20, lower housing 20 also moves axially inward relative to upper housing 18 so that flange 58 of spring mount 22 and lower flange 40 of upper housing 18 compress ejector spring 24 there between.

The additional compression of ejector spring 24 creates additional upward biasing of lower housing 18 and seal 16 toward upper housing 18 and out of filler neck 12. However, this additional force is not able to move lower housing 18 and seal 16 relative to upper housing 18 and filler neck 12 because of the latching engagement provided by detent 62 of lower housing 20 for each cam follower 42, which latching engagement blocks counterclockwise rotation of upper housing 18 relative to filler neck 12 and thus movement of upper housing 18 out of the filler neck under the urging of the ejector spring 24.

When the handle 13 is rotated in a counterclockwise cap-removal direction 72, lower housing 20 is pulled upwardly to a position adjacent upper housing 18 so that seal 16 is pulled from engagement with filler neck 12. Furthermore, engagement of helical mounting members 36 of upper housing 18 and complementary formations 37 of filler neck 12 pull upper and lower housings 18, 20 and seal 16 further out of filler neck 12 so that closure 10 can be removed from filler neck 12.

As mentioned above, a detent 62 and stop 64 are positioned to lie adjacent to an end of each cam surface 54 in order to prevent accidental sliding of the cam followers 42 down the cam surfaces 54. Of course, the cap may move in the loosening direction 72 if one applies sufficient torque to overcome the restraining force created by the cam followers 42 engaging the detents 62. Once sufficient torque is applied to the handle 13 in the loosening direction 72, the cam followers 42 will move past the detents 62 and will travel along the cam surfaces 54 toward the wall 63 (shown in FIG. 1).

Compressed ejector spring 24 aids in the removal of closure 10 by releasing the stored energy at the proper time during cap removal. During rotation of the handle 13 of closure 10, cam followers 42 are forced over detents 62 and cam followers 42 continue to ride along cams 54 so that lower housing 20 moves upwardly to a position adjacent upper housing 18 as shown in FIG. 2. This movement of lower housing 20 relative to upper housing 18 is assisted by the additional compression applied to ejector spring 24 during installation of the cap. Ejector spring 24 provides a force that pushes up on spring mount 22 to pull lower housing 20 toward upper housing 18 to assist in ejecting closure 10 from filler neck 12 during cap removal.

This force also aids in pulling seal 16 along filler neck 12 so that a user of closure 10 does not have to apply as much force during removal of closure 10 from filler neck 12. During removal, the user must apply an amount of torque to closure 10 to turn upper housing 18 relative to filler neck 12. A portion of this torque is used to pull seal 16 axially along filler neck 12. As previously mentioned, when seal 16 is swollen, the amount of torque required to remove closure 10 increases due to the increased compressive force applied to seal 12. The stored energy in ejector spring 24 reduces the amount of torque required to remove closure 10 by pulling lower housing 18 and seal out of filler neck 12. Thus, by compressing ejector spring 24 to store energy during installation of closure 10, this stored energy may be released to aid in removal of closure 10 during removal.

The ejector spring may also be positioned in other locations to aid in removal of the closure from the filler neck. For example, the ejector spring may be positioned between the lower housing member and the filler neck so that the spring is compressed between the filler neck and the lower housing member during installation. This compression will aid in removal of the closure by urging the lower housing member and the seal out of the filler neck. Furthermore, the ejector spring may be positioned between the filler neck and the upper housing or the handle so that the spring is compressed between the filler neck and the upper housing or the handle during installation. This compression will aid in removal of the closure by urging the upper housing, the lower housing, and the seal from the filler neck.

Figure 4:
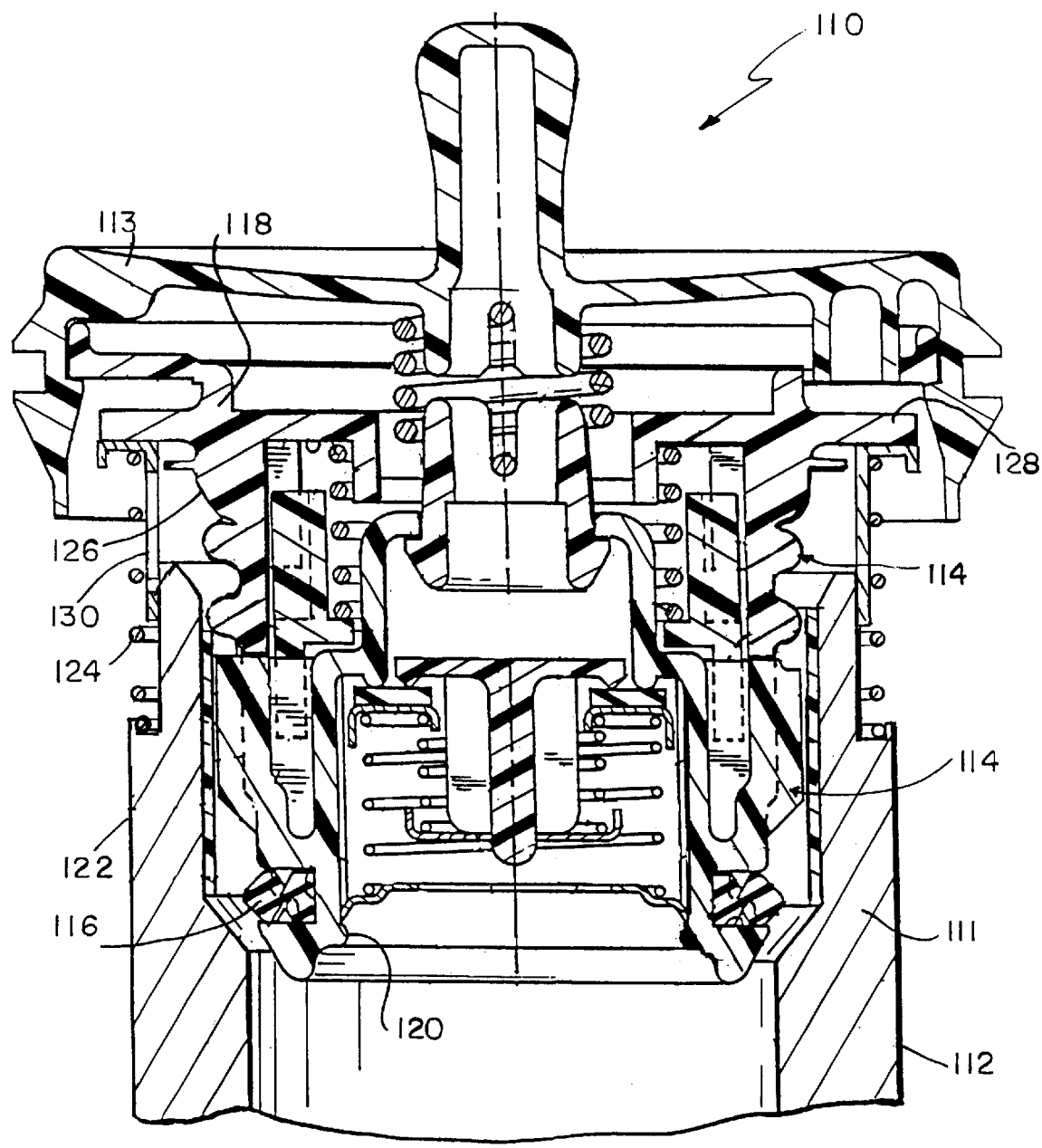
FIG. 4 is a side elevation view of a fuel tank closure according to an alternative embodiment showing the closure positioned in a fuel tank filler neck and biased against the filler neck by a compression spring.

A fuel tank closure 110 in accordance with an alternative embodiment of the present disclosure is shown in FIG. 4. Closure 110 is movable between a disengaged position (not shown) and an installed position as shown in FIG. 4 with closure 110 positioned in a fuel tank filler neck 112. Closure 110 includes a housing assembly 114 and a seal 116 coupled to housing assembly 114. While closure 110 is in the installed position, seal 116 engages filler neck 112 to substantially seal filler neck 112.

While seal 116 is engaged with filler neck 112, fuel (not shown) can cause seal 116 to swell. This swelling increases the compression force between seal 116 and filler neck 112. This increased force creates more resistance to removal of seal 116 from filler neck 112 making closure 110 more difficult to remove from filler neck 112.

To aid in removal of seal 116 from filler neck 12, closure 110 and seal 116 are axially biased outwardly to provide a force that assists in pulling seal 116 from filler neck 112. Filler neck 112 includes a compression spring 124 that provides this force. Spring 124 is compressed to store energy during installation of closure 110 112. During removal of closure 110, this stored energy is released to aid in pulling closure 110 and seal 116 from filler neck 112.

Housing assembly 114 includes an upper housing 118 and a lower housing 120 that carries seal 116. Lower housing 120 can move rotationally relative to upper housing 18. Further details of the operation of upper and lower housing 118, 120 and the remainder of closure 110 is disclosed in PCT Patent Application Ser. No. PCT/US96/19589 which has been expressly incorporated herein.

As previously mentioned, spring 124 is compressed to urge upper housing 118 of closure 110 upwardly out of filler neck 112. Upper housing 118 includes a cylindrical body 126 and an upper flange 128 coupled to cylindrical body 126. A handle is coupled to upper flange 128 for a user to grip and turn upper housing 118 when installing closure 110 into filler neck 112. As the handle of closure 110 is rotated, spring 124 is compressed to provide the biasing force between closure 110 and filler neck 112.

Filler neck 112 includes a body portion 111 having a spring-receiving groove 122. As shown in FIG. 4, spring 124 is positioned in groove 122 to support spring 124 during compression. Filler neck 112 further includes a spring guide 130 having a body portion 132 and a flange 134 coupled to body portion 132. During rotation of the handle 13, housing assembly 114 is pulled into filler neck 112. Axially inward movement of housing assembly 114 into filler neck 112 causes seal 116 to engage filler neck 112 to form the seal blocking the flow of fuel and fuel vapor from escaping from filler neck 112 between seal 116 and filler neck 112.

Upper flange 128 of upper housing 118 is pushed into engagement with support flange 134 of spring guide 130. As spring guide 130 is pushed downwardly, spring 124 is compressed to store energy. The compression of spring 124 creates the upward bias against housing assembly 114 and seal 116. As previously mentioned, the compression later aids in the removal of closure 110 by releasing the stored energy to provide the force that pushes up on upper flange 128 and the remainder of closure 110 to help push closure 110 from filler neck 112.

This force also aids in pulling seal 116 along filler neck 112 so that a user of closure 110 does not have to apply as much force during removal of closure 110 from filler neck 112. During removal, the user must apply an amount of torque to closure 110 to turn upper housing 118 relative to filler neck 112. A portion of this torque is used to pull seal 116 axially along filler neck 112. When seal 116 is swollen, the amount of torque required to remove closure 110 increases due to the increased compressive force applied to seal 116. The stored energy in spring 124 reduces the amount of torque required to remove closure 110 by biasing housing assembly 114 and seal 116 out of filler neck 112. Thus, by compressing spring 124 to store energy during installation of closure 110, the stored energy may be used to aid in remove of closure 110.

The spring may also be positioned in other locations to aid in removal of the closure from the filler neck. For example, the spring may be positioned between the lower housing member and the filler neck so that the spring is compressed between the filler neck and the lower housing member during installation. This compression will aid in removal of the closure by urging the lower housing member and the seal out of the filler neck. Furthermore, the spring may be directly coupled to the closure to move into engagement with the filler neck to provide the biasing force.

Although the invention has been described in detail with reference to certain preferred embodiments, variations and modifications exist within the scope and spirit of the invention as described and defined in the following claims.

What is claimed is:

1. A fuel cap for a filler neck of a vehicle fuel system, the cap comprising:
   an upper housing and a lower housing, each of the upper and lower housing being adapted for at least partial insertion into the filler neck of a vehicle fuel system, the upper housing and lower housing cooperatively configured for relative rotational and axial movement,
   a seal located on the lower housing for engagement with the filler neck,
   a spring retainer coupled to the lower housing, and
   a spring retained by the spring retainer against at least a portion of the upper housing for biasing the lower housing toward the upper housing to assist in loosening contact of the seal from the filler neck during removal of the fuel cap.

2. The cap of claim 1, further comprising a cam and cam follower connection between the upper and lower housing to provide said relative axial movement.

3. The cap of claim 1, further comprising at least one cam on an upper surface of the lower housing, the cam sloping upward toward the upper surface and configured to engage a respective cam follower depending from a lower flange of the upper housing, the cam and cam follower cooperatively configured such that as the upper housing is rotated relative to the lower housing, the upper housing and the lower housing are moved axially with respect to one another.

4. The cap of claim 1, further comprising at least one lug extending radially outwardly from the outer surface of the lower housing and wherein the at least one lug is configured to engage a respective notch in the filler neck when the cap is moved to the tightened position to prevent rotation of the lower housing relative the filler neck when the cap is in the tightened position.

5. The cap of claim 1, wherein the spring is a compression spring.

6. The cap of claim 1, wherein the spring retainer has a body with a flange extending outwardly and engaging an end of the spring and the body is configured to pass through the spring and engage the lower housing.

7. The cap of claim 3, further comprising a detent formed adjacent an upper end of the at least one cam, each detent being configured to selectively restrain the cam follower.

8. The cap of claim 1, further comprising a flange extending outwardly from the upper housing and formed to engage an upper lip of the filler neck as the cap is moved to the tightened position.

9. The cap of claim 1, further comprising a handle on the upper housing.

10. The cap of claim 9, further comprising a plurality of flexible arms on one of an upper surface of the upper housing and said handle, each flexible arm having a first end coupled to a corresponding surface and a second end having a pawl tooth, the flexible arms being biased to engage the other of the handle and upper housing in order prevent relative movement of the handle and upper housing when the handle is turned in a loosening direction and facilitating ratcheting relative movement of the handle and the upper housing when the handle is turned in a tightening direction to prevent over-tightening of the cap.

11. The cap of claim 1, further comprising a handle coupled to the upper housing and a drive between the upper and lower housing for creating relative axial movement when the upper housing is rotated with respect to the lower housing.

12. The cap of claim 11, the drive comprising at least one cam on a surface of one of the upper and lower housings and configured to engage a respective cam follower on another of the upper and lower housings.

13. The cap of claim 1, further comprising a mounting member on the upper housing for engaging a cooperative mounting member on the filler neck to cause the cap to move into the filler neck as the cap is rotated.

14. The cap of claim 11, wherein rotation of the cap in a loosening direction from a tightened position causes the spring to move the lower housing toward the upper housing.

15. The cap of claim 11, further comprising a stop positioned adjacent to a first end of the cam surface and configured to engage and stop the cam follower as the cap is turned in the tightening direction.

16. The cap of claim 15, further comprising a wall positioned at a second end of the cam surface and for abutting the cam follower when the cap is turned in a loosening direction.

17. The cap of claim 11, further comprising a mounting member on the upper housing engaging a cooperative mounting member on the filler neck to cause the cap to move into the filler neck as the cap is rotated.

18. The cap of claim 11, further comprising a flange extending outwardly from the upper housing and positioned to engage an upper lip of the filler neck as the cap is turned to the tightened position.

19. A fuel cap for a filler neck of a vehicle fuel system, the cap comprising
    a lower housing carrying a seal adapted to establish a sealed connection between the lower housing and a filler neck upon insertion of the lower housing to an installed position within the filler neck, the lower housing including a lug adapted to engage the filler neck to limit rotation of the lower housing about an axis of rotation of the lower housing in the filler neck and a cam,
    an upper housing carrying a handle at an upper end thereof and a cam follower at a lower end thereof, the upper housing including a cylindrical body carrying a helical mounting member adapted to engage and ride on complementary formations on the filler neck during rotation of the upper housing about the axis of rotation in the filler neck to cause the upper housing to move along the axis of rotation in response to rotation of the handle relative to the filler neck about the axis of rotation, the cam follower and cam cooperating to define means for moving the lower housing away from the upper housing along the axis of rotation to reach the installed position in the filler neck once rotation of the lower housing about the axis of rotation is blocked by engagement of the lug and the filler neck and during rotation of the upper housing about the axis of rotation in a cap-tightening direction, and
    means for biasing the lower housing upwardly along the axis of rotation toward the upper housing to assist in loosening contact of the seal and filler neck when the lower housing occupies the installed position within the filler neck during rotation of the upper housing relative to the lower housing about the axis of rotation in a cap-removal direction opposite to the cap-tightening direction, the biasing means being arranged to couple the lower housing to the upper housing for limited relative movement along the axis of rotation therebetween.

20. The cap of claim 19, wherein the biasing means includes an ejector spring and ejector means for compressing the ejector spring to store energy therein during movement of the lower housing away from the upper housing to reach the installed position and using the energy stored in the ejector spring upon rotation of the upper housing relative to the lower housing about the axis of rotation in the cap-removal direction to urge the lower housing to move upwardly toward the upper housing so that the lower housing leaves the installed position to cause the seal carried on the lower housing to move to disengage the filler neck.

21. The cap of claim 20, wherein the ejector means includes a spring mount coupled to the lower housing to trap the ejector spring in a space between a flange included in the spring mount and a flange included in the upper housing.

22. The cap of claim 21, wherein the flange included in the upper housing includes an axially upwardly facing surface engaging a lower end of the ejector spring and an axially downwardly facing surface carrying the cam follower.

23. The cap of claim 21, wherein the flange included in the upper housing is formed to include an aperture, the spring mount includes a sleeve positioned to extend through the aperture, a connector located on a lower end of the sleeve and coupled to the lower housing, the flange included in the spring mount is located on an upper end of the sleeve, and the ejector spring is located in a chamber formed in the upper housing and arranged to wind around the sleeve to cause an upper end of the ejector spring to engage an axially downwardly facing surface of the flange included in the spring mount and a lower end of the ejector spring to engage an axially upwardly facing surface of the flange included in the upper housing.

24. The cap of claim 19, wherein the biasing means includes an ejector spring and a spring mount coupled to the lower housing for movement relative to the upper housing to trap the ejector spring in a chamber formed in the upper housing between a flange included in the spring mount and a flange included in the upper housing.

25. The cap of claim 24, wherein the flange included in the upper housing is formed to include an aperture, the spring mount further includes a sleeve arranged in the aperture to slide therein relative to the upper housing during relative movement between the upper and lower housings, and the flange included in the spring mount is coupled to an upper end of the sleeve.

26. The cap of claim 24, wherein the upper housing includes an interior cylindrical side wall that cooperates with an axially upwardly facing surface on the flange included in the upper housing to define the chamber formed in the upper housing.

27. The cap of claim 26, wherein the flange included in the upper housing includes an axially downwardly facing surface carrying the cam follower.

28. The cap of claim 26, wherein the spring mount includes a sleeve that extends into the chamber formed in the upper housing through an aperture formed in the flange included in the upper housing and carries the flange included in the spring mount to position the flange included in the spring mount in spaced-apart relation to the flange included in the upper housing to trap the ejector spring therebetween and in a space between the interior cylindrical side wall of the upper housing and an exterior side wall of the sleeve.

29. A fuel cap for a filler neck of a vehicle fuel system, the cap comprising:
    a lower housing;
    a seal carried on the lower housing and adapted to establish a sealed connection between the lower housing and a filler neck upon insertion of the lower housing to an installed position within the filler neck;
    a lug on the lower housing adapted to engage the filler neck and limit rotation of the lower housing in the filler neck; and
    a cam associated with the lower housing;
    an upper housing cooperatively positioned proximate the upper housing;

a handle carried on the upper housing;

a cam follower carried on the upper housing for cooperative engagement with the cam on the lower housing;

at least one generally helical mounting member on the upper housing adapted to engage and ride on complementary formations on the filler neck during rotation of the upper housing in the filler neck to cause the upper housing to move in response to rotation into the filler neck;

the cam follower and cam cooperating for moving the lower housing away from the upper housing upon rotation of the handle to the installed position;

the lug engaged in the filler neck upon rotation of the upper housing in a cap-tightening direction for resisting rotation of the lower housing, and means for biasing the lower housing toward the upper housing to assist in loosening contact of the seal and filler neck when the lower housing occupies the installed position within the filler neck during rotation of the upper housing relative to the lower housing in a cap-removal direction opposite to the cap-tightening direction, the biasing means being arranged to couple the lower housing to the upper housing for limited relative movement therebetween.

* * * * *